United States Patent Office 2,731,881
Patented Jan. 24, 1956

2,731,881
PRISM SYSTEM FOR BINOCULAR TUBES

Dierick Kossel and Paul Sindel, Wetzlar, Germany, assignors to Ernst Leitz, G. m. b. H., a corporation of Germany Application November 9, 1951, Serial No. 255,586

Claims priority, application Germany November 16, 1950

3 Claims. (Cl. 88—39)

The object of this invention is to provide an improved prism system for binocular tubes, for example for binocular microscopes, whereby to obtain the greatest possible and equal intensities of illumination from both paths of the light rays and for both directions of polarization.

The invention is embodied in a prism light beam splitting system for binocular tubes in which a plurality of homogeneous partially reflecting layers are positioned in the paths of the light rays, one layer following the other layer, in such order or sequence that each bundle of light rays is reflected just as often as it is transmitted by the said layers.

Binocular microscopes for use with only one objective are provided with a light rays dividing prism which transmits the bundle of rays to the two oculars by means of reflecting prisms. See, for example, German Patent No. 376,976, October 8, 1922, and German Patent No. 418,740, September 1, 1922.

The element which divides the light rays is usually a "semitransparent" reflecting layer, the reflecting value or power "R" of which is more or less equal to its power of transmission "D." By reason of the absorption of light in the thin reflecting layer, the said values are not equal to 50% each, but less than 50%. For example, in a layer of aluminum, such as is commonly used, the said values "R" and "D" are each equal to 25%. However, depending upon the thickness of the layer, "R" and "D" are often not equal.

A prism system of this character is insufficient for the examination of pleochroic or optical-active objects, particularly in the art of polarization microscopy because the reflecting surface, which is usually inclined at an angle of 45 degrees to the path of the light rays, has a power of reflection which is different for the light components "$R_{||}$" and "$R_\perp$" which are polarized parallel to the plane of incidence and those which are polarized at a right angle thereto.

If the intensity of each incident component be fixed at 100%; and the values of the reflected components (electric vector) be designated $R_{||}$ and $R_\perp$; and the values of the transmitted components (electric vector) be designated $D_{||}$ and D , then, with a dividing layer of aluminum as referred to above, the following equations will be established, namely that $$R_\perp = 29\%$$
$$R_{||} = 16\%$$
$$\overline{R_\perp + R_{||} = 45\%}$$

and $$D_\perp = 14\%$$
$$D_{||} = 31\%$$
$$\overline{D_\perp + D_{||} = 45\%}$$

It will be noted that although the total intensity in both oculars is equal, the portions which constitute the two components are different in degrees so that polarizing objects appear differently illuminated in the two fields of view. It may even happen that such an object will appear bright in one ocular, but dark against the background in the other ocular.

As pointed out above, the invention is embodied in a prism system in which "semitransparent" layers are placed in the paths of the light rays so that each bundle of rays is reflected as often as it is transmitted by said layers. In accordance with the invention, the light rays which are transmitted through a first layer are reflected from a second similar layer. The light rays which are reflected from the first layer are transmitted by a third layer. In addition, the thicknesses and the reflecting and transmitting power of the layers may be so selected that $R_{||} \cdot D_{||} = R_\perp \cdot D_\perp$.

Figure 1:
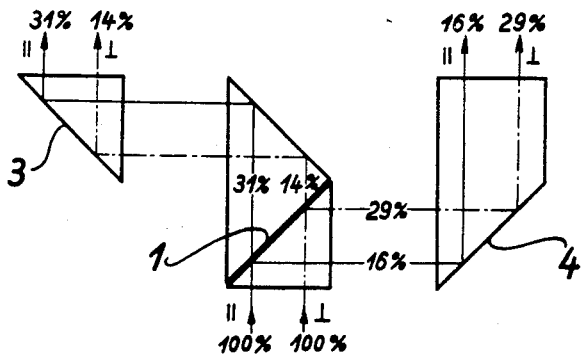
Fig. 1 shows a known type of prism system for dividing the light rays.

Fig. 1 is shown for the purpose of a better understanding of the invention and the novelty of the proposed prism system. In this view, 45% of each bundle of light rays is transmitted to the oculars, not shown, but the light components which are polarized at a right angle to each other are very different in values. The light rays portions which are polarized (electric vector) parallel to the plane of incidence are in the one bundle 31% and in the other bundle of rays 16%, whereas the components which are polarized at a right angle to the plane of incidence are 14% and 29%, respectively, as shown.

Figure 2:
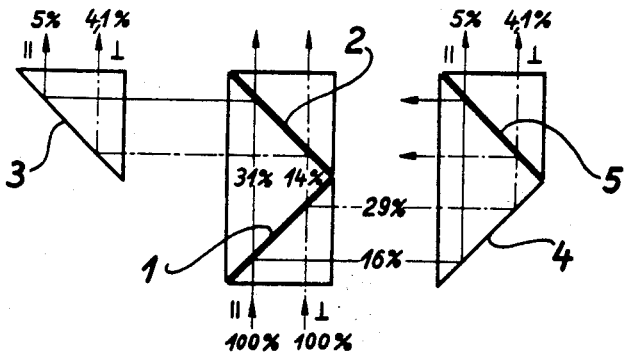
Fig. 2 shows an example of a prism system embodying this invention.

Fig. 2 shows a light beam splitting prism system embodying the invention. The bundle of rays which passes through the first layer 1 strikes the second layer 2 from which a portion of the rays are reflected and passes to the total reflecting prism 3 and out. That portion of the rays which goes through the layer 2 is not used. A portion of the incoming rays is reflected from the first layer 1 toward the total reflecting prism 4 and is reflected from the latter to the third layer 5. The latter transmits a portion of the rays to be used for illumination while the reflected rays remain unused. The degree of intensity of the useful outgoing rays is equal to the product RD.

If the semitransparent reflecting layer in Fig. 2 consists of aluminum layers with a 45% transmitting power and 45% reflecting power the same as is shown in Fig. 1, then the intensity $I = I_\perp + I_{||}$ in each ocular will be $$I_\perp = R_\perp \cdot D_\perp = 0.16 \cdot 0.31 = 0.05 \text{ or } 5\%$$
$$I_{||} = R_{||} \cdot D_{||} = 0.29 \cdot 0.14 = 0.0406 \text{ or } 4.06\%$$

From these equations it will be seen that the image in the two oculars, not shown, are of the same brightness or equally illuminated independent of the condition of polarization of the incoming bundle of light rays. However, there is a material loss of light and there is no perfect equality in the degrees of illumination obtained from the two conditions of polarization. Thus, for example, while a certain crystal may appear equally illuminated in the two oculars, such illumination depends upon the orientation of the object with respect to the plane of incidence which is determined by the reflecting surfaces.

A more perfect solution of the problem results if the equation $R_{||} \cdot D_{||} = R_\perp \cdot D_\perp$ is maintained. This may be done by selecting a suitable material for the semitransparent layers and by the use of an appropriate thickness of such selected layers.

Figure 3:
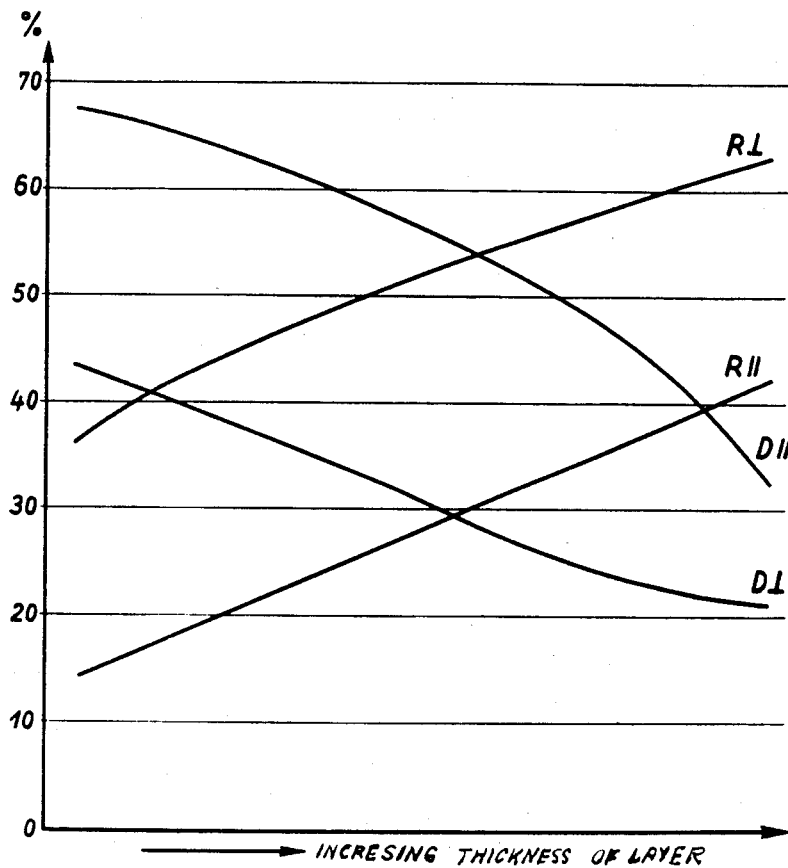
Fig. 3 is a diagram illustrating the dependence of the powers of reflection and transmission upon the thicknesses of layers of silver.
Figure 4:
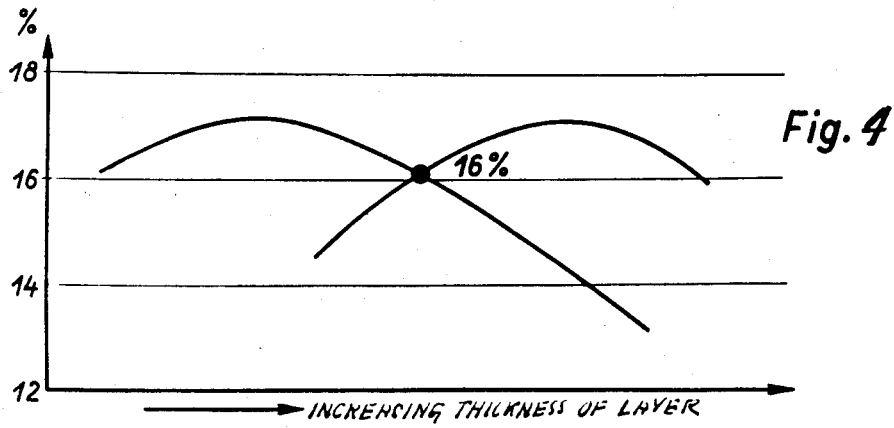
Fig. 4 is a diagram which shows the products curves of $R_\perp$, $D_\perp$ and $R_{||}$, $D_{||}$.

Fig. 3 illustrates diagrammatically the dependence of the powers of reflection and transmission of light upon the thickness $d$ of silver layers or films. The products $R\perp \cdot D\perp$ and $R\| \cdot D\|$ are diagrammatically illustrated in Fig. 4. It will be noted that both products are equal for a given thickness $d$ of the layer F, the thickness of which is about 150 AE. The silver layer may be obtained by depositing silver vapors in vacuum until the layer by photometric test indicates the desired power of reflection.

Figure 5:
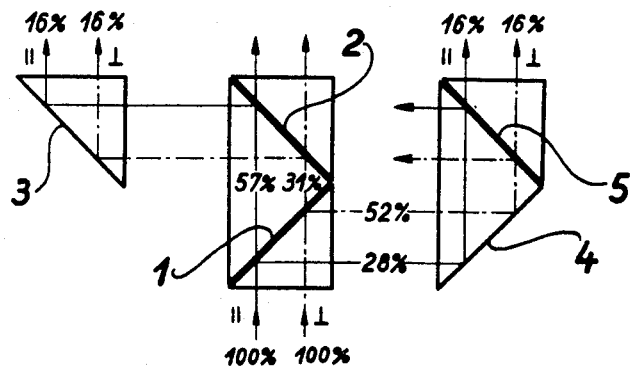
Fig. 5 shows a prism system with layers of silver.

If the system in Fig. 2 includes reflecting layers selected in accordance with the above stated conditions, namely the kind of material selected and the thickness of the layer, then $R\perp \cdot D\perp = R\| \cdot D\| = 16\%$ as shown by the percentages indicated in Fig. 5 for the several separate layers. Here it is shown that all the light components are of equal strengths and the loss of light is less than the loss of light illustrated in Fig. 2.

We claim:

1. An optical light beam splitting system for binocular tubes comprising a plurality of light transmitting and light reflecting prisms having light transmitting and light reflecting layers consisting of a first such layer for transmitting and reflecting, respectively, the incoming light rays; a second such layer for reflecting and transmitting, respectively, the transmitted rays from the said first layer; and a third such layer for transmitting and reflecting, respectively, the said reflected rays from the said first layer; each of said transmitting and reflecting layers having transmitting and reflecting powers approximately fulfilling the equation $R\perp \cdot D\perp = R\| \cdot D\|$, wherein $R\perp$ and $D\perp$ represent the reflected and transmitted components polarized at a right angle to the plane of incidence, and $R\|$ and $D\|$ represent the components polarized parallel to the plane of incidence according to the known Fresnel's formulae.

2. A light beam splitting system for binocular tubes comprising a plurality of light transmitting and light reflecting prisms containing at least three homogeneous light beam splitting layers; a first such layer being positioned in the path of the incoming bundle of light rays; a second such layer being positioned in the path of the bundle of rays reflected from said first layer; a third such layer being positioned in the path of the bundle of rays transmitted from said first layer so that each of the bundles of light rays passing to the oculars of the binocular tubes are transmitted as often as it is reflected by the said layers, each of said layers having transmitting and reflecting powers approximately fulfilling the equation $R\perp \cdot D\perp = R\| \cdot D\|$, wherein $R\perp$ and $D\perp$ represent the reflected and transmitted components polarized at a right angle to the plane of incidence, and $R\|$ and $D\|$ represent the reflected and transmitted components polarized parallel to the plane of incidence according to the known Fresnel's formulae.

3. A light beam splitting system for binocular microscope tubes comprising intermediate prisms positioned directly in the path of the incoming bundle of light rays; prisms for the binocular tubes positioned on opposite sides of said intermediate prisms to receive reflected light rays therefrom; light transmitting and light reflecting layers in said intermediate prisms and in one of said binocular tube prisms for transmitting the light rays as often as said light rays are reflected by said layers; each of said layers having transmitting and reflecting powers approximately fulfilling the equation $$R\perp \cdot D\perp = R\| \cdot D\|$$

wherein $R\perp$ and $D\perp$ represent the reflected and transmitted components polarized at right angles to the plane of incidence; and $R\|$ and $D\|$ represent the reflected and transmitted components polarized parallel with the plane of incidence according to the known Fresnel's formulae; the light rays received by said binocular tube prisms emerging from said tube prisms with a substantial equal degree of light intensity.

References Cited in the file of this patent

UNITED STATES PATENTS 1,722,356    Romer                July 30, 1929

FOREIGN PATENTS 353,234    Italy                  Oct. 8, 1937